A. KESSLER, Jr.
TIRE.
APPLICATION FILED MAR. 4, 1908.

959,353.

Patented May 24, 1910.

Witnesses
Joe. P. Wahler.

Inventor
Alexander Kessler, Jr.
By Victor J. Evans
Attorney

UNITED STATES PATENT OFFICE.

ALEXANDER KESSLER, JR., OF WINDOM, MISSOURI.

TIRE.

959,353.
Specification of Letters Patent.
Patented May 24, 1910.

Application filed March 4, 1908. Serial No. 419,206.

*To all whom it may concern:*

Be it known that I, ALEXANDER KESSLER, Jr., a citizen of the United States of America, residing at Windom, in the county of St. Louis and State of Missouri, have invented new and useful Improvements in Tires, of which the following is a specification.

This invention relates to vehicle tires, and the object of the invention is to provide a pneumatic tire for vehicles having a solid rubber tread, and being so constructed as to entirely protect the pneumatic tire employed with the invention upon all sides.

With these and other objects in view, the invention resides in the novel construction of elements and their arrangement in operative combination, as will hereinafter be more fully described and claimed.

Figure 1:
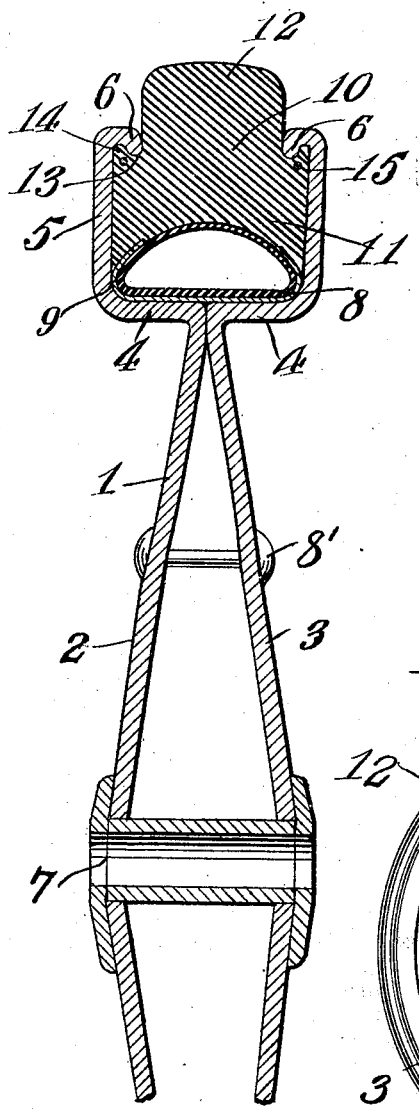
Figure 2:
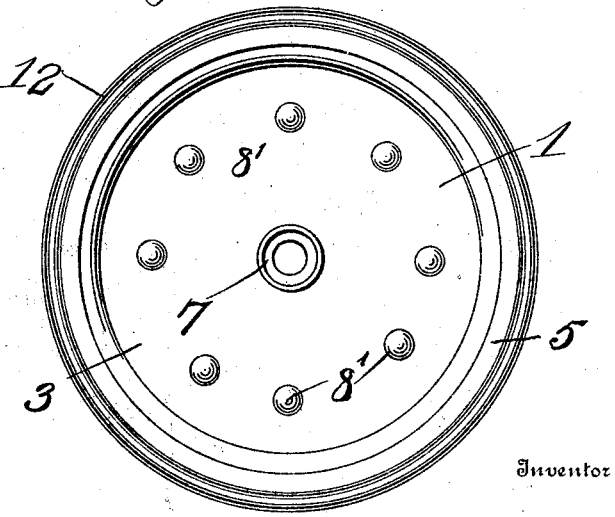

In the drawings,—Figure 1 is a vertical longitudinal sectional view of the wheel provided with my improved tire. Fig. 2 is a front elevation of the same.

In the accompanying drawings, the numeral 1 designates a vehicle wheel, constructed preferably of iron, steel or other suitable material. The wheel 1 comprises two sections 2 and 3 provided at their upper edges with a right-angular offset 4, having a vertical side 5, and terminating in an inturned lip or offset 6. The members 2 and 3 are joined together at their upper extremities and are caused to diverge or spread away from each other from this point of connection to their connections with the hub 7. Suitable bolts or other retaining elements 8' are employed in holding the members 2 and 3 in proper relation with each other, and the hub 7 is provided upon each of its ends with offsets or rings adapted to engage both of the outer sides of the members at their points of connection with the hub, whereby the members are effectively retained in spaced position upon the hub and in relation to each other.

Inserted within the boxing formed by the offset 4 and vertical wall 5 of the members 2 and 3, is positioned a pneumatic tube 8 extending around the entire inner periphery of the boxing and provided with suitable inflating openings, not shown. The pneumatic tube 8 is protected from the iron boxing 4 by a suitable cloth or other flexible substance 9, and has positioned immediately above and corresponding to its outer face a tread or tire 10. This tread or tire 10 comprises a body member 11 adapted to fit within the boxing over the pneumatic tire 8, and is provided with a reduced portion 12, forming the tread proper of the element. The sides of the reduced portion are provided with a channel 13 extending around the entire periphery of the tread at its point of meeting with the lip 6 of the vertical wall 5 of the members 2 and 3, and extending from this channel and to the outer sides of the enlarged portion 11 of the tread is a lip 14 of a shape agreeing with the channel between the lip 6 and the vertical wall 5. Suitable wires 15, or other strengthening devices, are employed and adapted to extend around the solid tire or tread 10 at any suitable or desired points, and preferably just below the engagement of the tire with the lip 6, whereby the rubber tread or tire is materially strengthened at points where weakness is most liable to occur.

From the above description, it will be seen that I have provided a substantially metal wheel having a pocket provided upon its outer periphery adapted to retain a pneumatic tire and a rubber tread positioned above the tire, whereby the tire is protected upon all sides from punctures.

It will be still further noted that should the pneumatic tube become deflated the solid tire will sink within the boxing provided by the rim and the offsets upon the sides of the boxing will serve as an effective tread to support the vehicle to which the wheels are attached.

Having thus described the invention, what is claimed as new, is:—

A wheel having its body constructed of a pair of disks, said disks having their upper edges contacting and provided with substantially U-shaped offsets and extending around their entire periphery, the offset portions adapted to provide a pocket, a solid resilient tire within the pocket, a pneumatic tire below the solid tire, and the central portion of the disks being spaced and provided with a hub.

In testimony whereof I affix my signature in presence of two witnesses.

ALEXANDER KESSLER, JUNIOR.

Witnesses:
A. D. WILLECKEN,
WM. SEIBEL.